United States Patent [19]

Raahauge

[11] Patent Number: 4,943,817

[45] Date of Patent: Jul. 24, 1990

[54] ADAPTOR FOR UNIVERSAL X-Y PLOTTER PEN

[75] Inventor: Jerald C. Raahauge, San Jose, Calif.

[73] Assignee: Sumner & Taylor, Inc., San Jose, Calif.

[21] Appl. No.: 270,837

[22] Filed: Nov. 14, 1988

[51] Int. Cl.⁵ .................. G01D 15/16; B23B 5/22; B43L 13/00

[52] U.S. Cl. .................. 346/140 A; 346/139 R; 346/140 R; 33/18.1; 33/32.3; 33/44; 279/46 R

[58] Field of Search .......... 346/139 R, 140 R, 140 A, 346/145, 146; 15/435, 444, 438, 440; 33/32.3, 44, 1 M, 18.1; 294/99.1, 86.1, 86.2; 414/751; 279/96, 102, 46, 23; D19/41

[56] References Cited

U.S. PATENT DOCUMENTS 4,540,993 9/1985 Gunderson et al. .......... 346/139 R
4,845,516 7/1989 Onozato .......... 346/139 R Primary Examiner—Bruce A. Reynolds
Assistant Examiner—Huan Tran
Attorney, Agent, or Firm—John J. Leavitt

[57] ABSTRACT

Presented is an adaptor for use with a universal plotter pen that enables use of the universal plotter pen in many different X-Y plotter mechanisms. The interior configuration and dimensions of the adaptor, including elongated longitudinal ribs, are such as to snugly receive and frictionally retain the body of the plotter pen in a stable axial relationship with the adaptor body, which is tubular to receive the plotter pen body. A control boss is provided within the tubular body of the adaptor to limit the extent of insertion of the plotter pen, and slots are formed in the tubular body of the adaptor to give access to the exposed end of the plotter pen body that projects through the slots to facilitate digital imposition of an axially directed force on the end of the plotter pen to effect ejection of the plotter pen from the adaptor body.

17 Claims, 3 Drawing Sheets

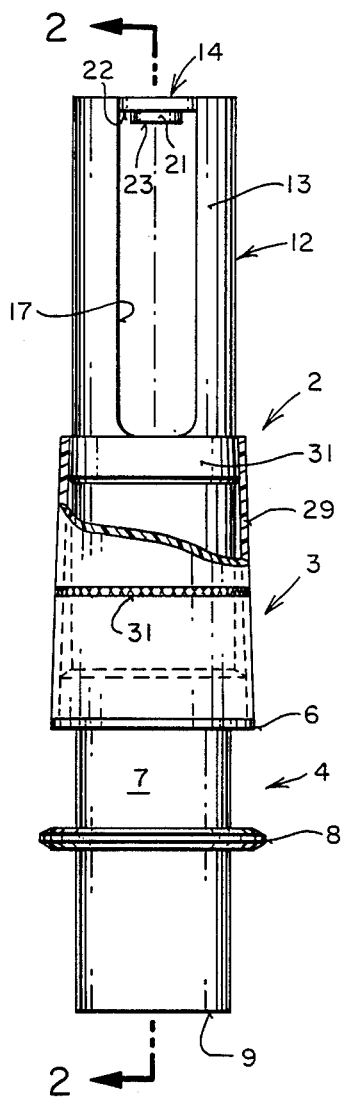
FIG 1
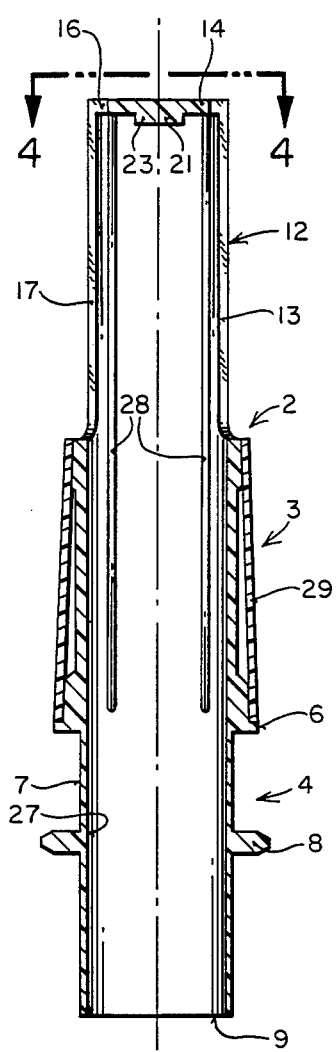
FIG 2
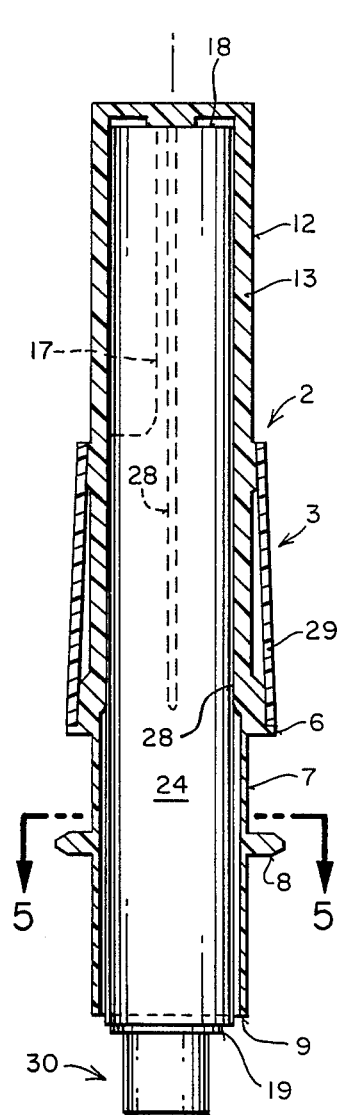
FIG 3
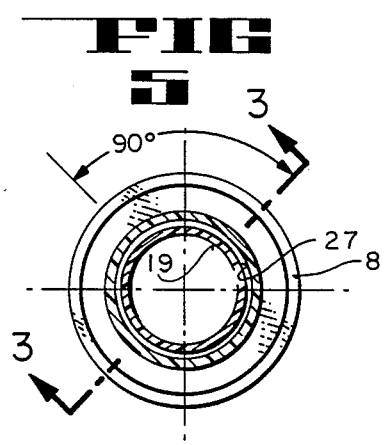
FIG 5
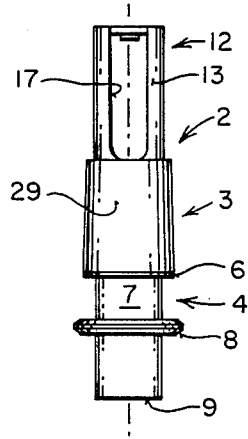
FIG 6
FIG 4

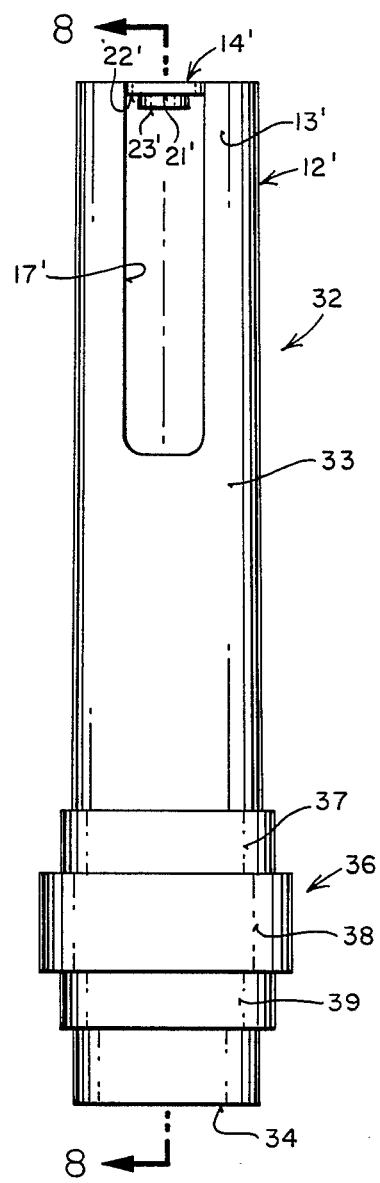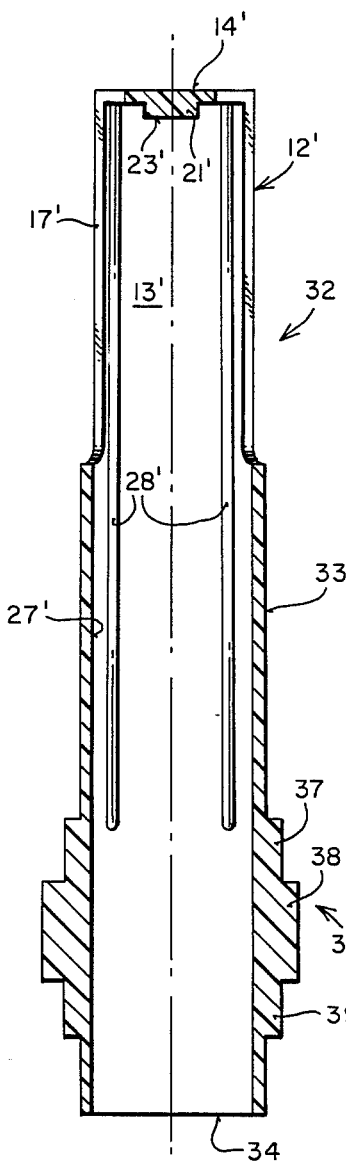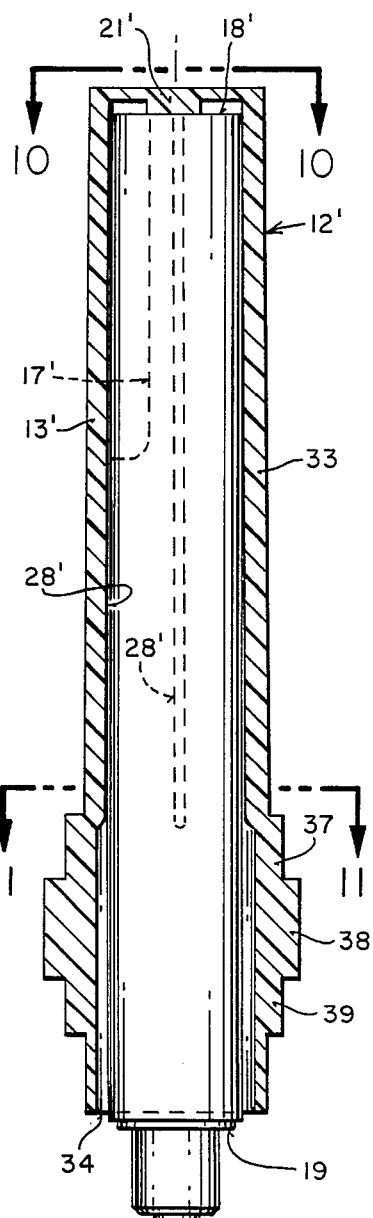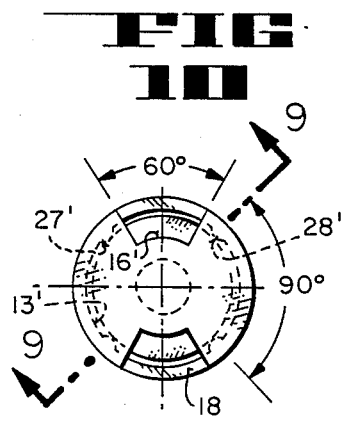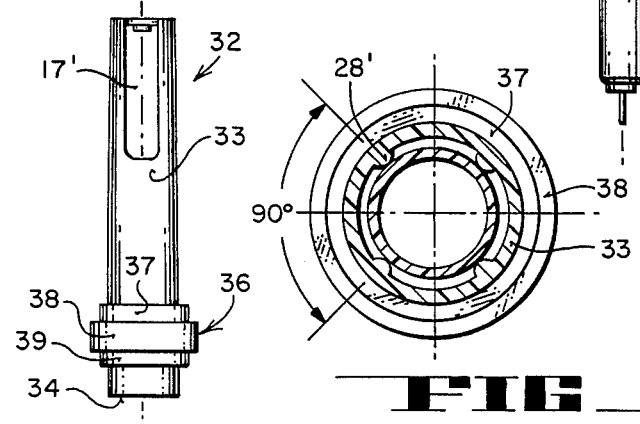

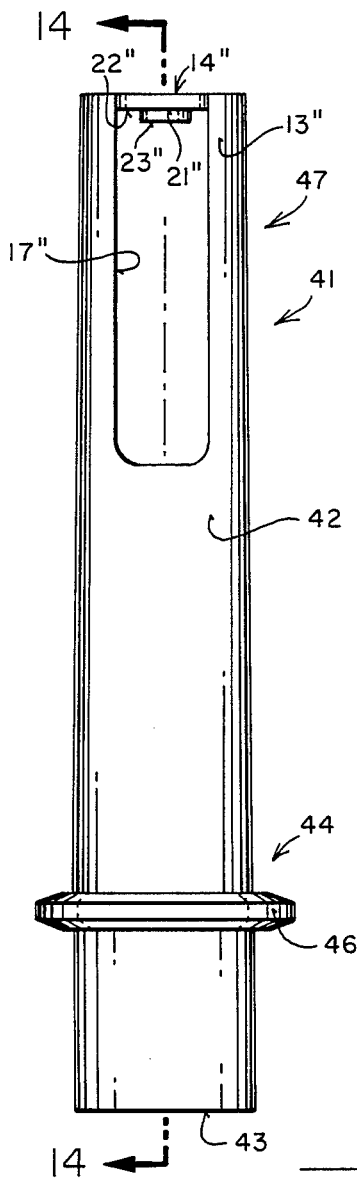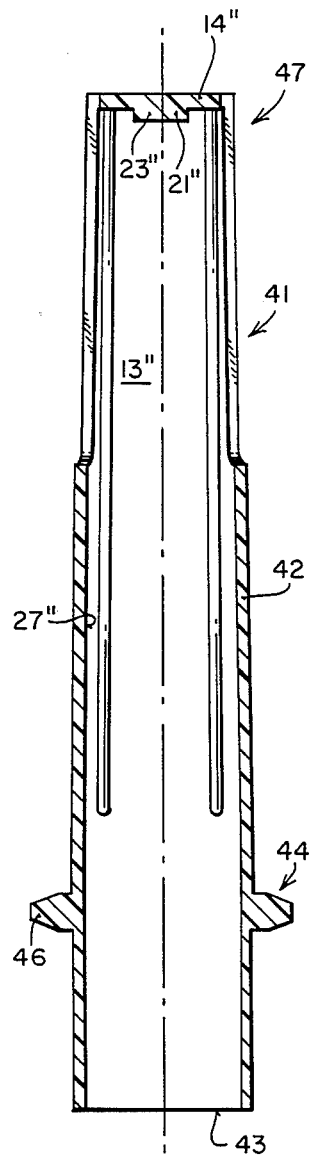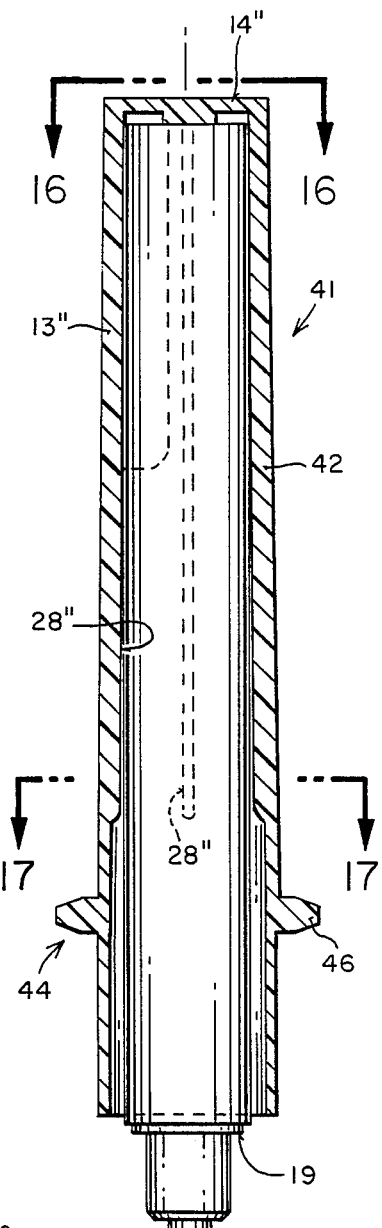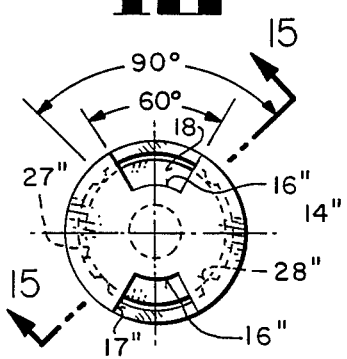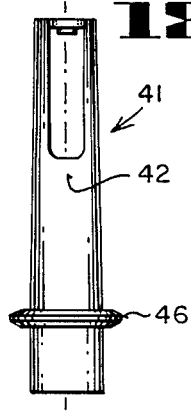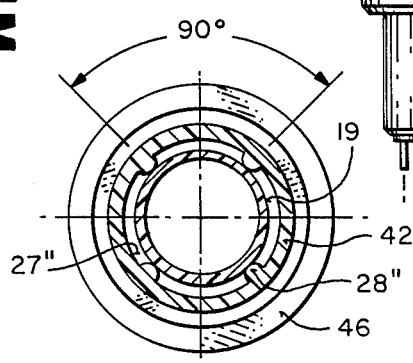

ADAPTOR FOR UNIVERSAL X-Y PLOTTER PEN

BACKGROUND OF THE INVENTION

1. Field of the Invention.

This invention relates to X-Y plotters, and more particularly to an adaptor for accommodating a universal plotter pen to the several different types of X-Y plotter mechanisms that are commercially available.

2. Description of the Prior Art.

A preliminary patentability and novelty search through Class 33, sub-classes 18.1, 32.3, 44, and 1m; and Class 346, subclasses 139 and all Alfas has revealed the existence of U.S. Pat. Nos. 4,489,333, 4,577,409 and 4,673,954.

Additional patents known to exist include U.S. Pat. Nos. 3,550,276; 3,686,681; 3,880,294 and 4,288,798.

While these patents appear to be of academic interest, none appear to deal directly with the question of an adaptor or adaptors that accommodate a single universal pen to the multiple types of plotting mechanisms that are available on the commercial market.

It has generally been the practice of major manufacturers of X-Y plotting equipment to design their own plotter pens that are dedicated to their particular X-Y plotter mechanisms. There has thus resulted in the industry a multiplicity of X-Y plotter mechanisms and a multiplicity of plotter pen designs, specific ones of these many different plotter pen designs being dedicated to the many different types of X-Y plotter mechanisms. Two companies, namely, Koh-I-Noor Rapidograph, Inc., and Dia-Nielsen USA, Inc. appear to be involved in the design of liquid ink pens, while J.S. Staedtler, Inc. and Dia-Nielsen USA, Inc. appear to be involved in the production of plotter pens and adaptors. For instance, J.S. Staedtler, Inc. advertises the following adaptors for use with plotter mechanisms produced by the manufacturers tabulated below:

| Calif. Comp. Prods., Inc. | Hewlett-Packard | Houston Instument |
|---|---|---|
| 75PL 03H10 | 75PL 07H1 | 75PL 03H10 |
| 75PL 05H | 75PL 07H2 | |
| | 75PL 07H3 | |

So far as I have been able to determine, all of these adaptors are screw-type having internal threads that threadably engage complementary threads on the plotter pen, thus requiring a twisting action or relative rotational displacement between adaptor and plotter pen for engagement of the adaptor on the pen.

Several companies, including California Computer Products, Inc., Hewlett-Packard Inc., and Houston Instrument, Inc. appear to be significantly involved in connection with the manufacture of X-Y plotter mechanisms, while other companies, such as Koh-I-Noor Rapidograph, Inc., Hitachi, Ltd., and Matsushita Electric Industrial Co., Ltd. are believed to also be represented in the industry.

Accordingly, one of the important objects of the present invention is to provide a set of adaptors that will accommodate the configuration of a universally applicable plotter pen to any of these X-Y plotter mechanisms now available on the commercial market or which might be available in the future.

Because each of the X-Y plotter mechanisms that may be purchased commercially possesses its own idiosyncrasies, it is important that any adaptor that be designed to accommodate a universal pen for that X-Y plotter, incorporate means by which the adaptor may be simply and quickly modified to accommodate manufacturing discrepancies in the universal pen which might otherwise prevent accommodation of the adaptor and pen in a particular plotter. Accordingly, another important object of the invention is to provide an adaptor incorporating such means for quick and easy modification to accommodate idiosyncrasies in either the X-Y plotter mechanism or discrepancies in the configuration of the universal pen.

It has been my observation that all of the adaptors that are presently on the market incorporate screw threads in one way or another to join the plotter pen to the adaptor, thus requiring a twisting action or a relative rotation between the adaptor and the plotter pen to engage the plotter pen in the adaptor. Accordingly, another object of the present invention is to provide an adaptor that will accept a universal plotter pen merely by the imposition of oppositely directed axial forces imposed on the pen and adaptor until the pen is appropriately seated in the adaptor.

Another object is the provision of a plotter pen adaptor which provides a visual indication when the plotter pen is appropriately seated in the adaptor.

Heretofore, with conventional adaptors and plotter pens, it has been necessary to utilize a twisting action, or relative rotation between the adaptor and the plotter pen, to remove a plotter pen from the adaptor. Accordingly, a still further object of the present invention is to provide an adaptor from which the plotter pen may be removed simply by the imposition of oppositely directed axial forces on the plotter pen and adaptor.

A still further object of the invention is the provision of one or more adaptors which may accommodate a universally configured and dimensioned plotter pen simply through frictional engagement between selected inner peripheral portions of the adaptor and the exterior surface of the universal plotter pen.

A still further object of the invention is the provision of an adaptor, or a set of adaptors, that are inexpensive to manufacture yet are extremely accurate and reliable in their dimensional stability.

The invention posseses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, there is provided an adaptor for receiving a universal plotter pen so that the universal plotter pen, or other pens having a similar dimensional configuration may be accommodated by the adaptor for mounting in the many different X-Y plotter mechanisms commercially available. The adaptor forming the subject matter of this invention includes an elongated tubular sleeve having a length corresponding to a significant portion of the length of the tubular body of a universal plotter pen and having an inner periphery devoid of threads and adapted to snugly and frictionally yet removably receive the tubular body of a plotter pen when the plotter pen is inserted into the cylindrical body merely by the application of axial pressure in opposite directions on the plotter pen and the adaptor that receives it. Means are provided on the exterior surface of the elongated tubular sleeve adapted to operationally cooperate with X-Y plotter mechanisms of different design whereby one of said adaptors, having the appropriate exterior configuration, and with a universal pen mounted therewithin, may be selectively and detachably mounted on a particular X-Y plotter mechanism. Means are also provided on the elongated tubular sleeve giving access to the closed end portion of the tubular plotter pen mounted within the elongated tubular sleeve whereby an axially directed force may be imposed on the end of the plotter pen to effect removal thereof from the enclosing frictionally engaging elongated tubular sleeve. Means are also provided within the interior of the elongated tubular sleeve forming the adaptor for positioning a plotter pen inserted thereinto in a predetermined axial relationship with the surrounding elongated tubular sleeve of the adaptor.

BRIEF DESCRIPTION OF THE DRAWINGS

FIG. 1 is a side elevational view of one embodiment of the invention comprising the adaptor for use in X-Y plotter mechanisms manufactured by California Computer Products, Inc.

FIG. 2 is a longitudinal cross-sectional view taken in the plane indicated by the line 2—2 of FIG. 1.

FIG. 3 is an assembly view illustrating the adaptor of FIGS. 1 and 2 shown in vertical cross-section and a plotter pen frictionally secured within the tubular body of the adaptor.

FIG. 4 is an end elevational view taken in the plane indicated by the line 4—4 of FIG. 2 in the direction of the arrows.

FIG. 5 is a horizontal cross-sectional view taken in the plane indicated by the line 5—5 in FIG. 3, and taken in the direction of the arrows.

FIG. 6 is an elevational view similar to FIG. 1 but shown approximately actual size.

FIG. 7 illustrates a second embodiment of the invention shown in elevation.

FIG. 8 constitutes a vertical cross-sectional view taken in the plane indicated by the line 8—8 of FIG. 7.

FIG. 9 is an assembly view partly in section and partly in elevation illustrating the frictional interrelationship between the adaptor of FIGS. 7 and 8 and a universal plotter pen.

FIG. 10 is an end view of the adaptor taken in the plane indicated by the line 10—10 of FIG. 9 and in the direction of the arrows.

FIG. 11 is a horizontal cross-sectional view taken in the plane indicated by the line 11—11 of FIG. 9, and illustrating the frictional interrelationship between the adaptor and the exterior periphery of a plotter pen.

FIG. 12 is a view similar to FIG. 7, but showing the adaptor approximately actual size.

FIG. 13 is an elevational view of a third embodiment of the adaptor of the invention, comprising an adaptor acceptable in the Hewlett-Packard, Inc. X-Y plotter mechanism.

FIG. 14 is a vertical cross-sectional view taken in the plane indicated by the line 14—14 of FIG. 13.

FIG. 15 is an assembly view, partly in elevation and partly in section of the adaptor of FIGS. 13 and 14, and shown with a universal plotter pen inserted thereinto and frictionally held therein.

FIG. 16 is an end elevational view taken in the plane indicated by the line 16—16 of FIG. 15 and in the direction of the arrows.

FIG. 17 is a horizontal cross-sectional view taken in the plane indicated by the line 17—17 and in the direction of the arrows.

FIG. 18 is a view similar to FIG. 13, but showing the adaptor approximately actual size.

All of the figures innumerated above except FIGS. 6, 12 and 18 are shown in a greatly enlarged scale for purposes of clarity. FIGS. 6, 12 and 18 are shown approximately actual size as a basis of comparison with the enlarged figures.

DESCRIPTION OF THE PREFERRED EMBODIMENT

In terms of greater detail, it will be apparent from the drawings that the exterior configurations of the adaptors therein illustrated are chosen to fit the specific adaptor in question to a specific X-Y plotter mechanism. The differences in the exterior configurations of these adaptors will be described hereinafter. However, it is important to note that the operative internal characteristics of each of the adaptors illustrated in FIGS. 1, 7 and 13 are chosen to accommodate a universal plotter pen of the type that is conventionally manufactured by Koh-I-Noor Rapidograph, Incorporated, the exterior configurations of which are illustrated in FIGS. 3, 9 and 15. Obviously, there are other manufacturers of plotter pens having this same external configuration and such plotter pens produced by other manufacturers may also be utilized in the adaptors illustrated. Additionally, it should be understood that while I have illustrated only three embodiments of adaptors that incorporate exterior configurations and dimensions that pertain to three different X-Y plotter mechanisms, it is obvious that other external configurations for the adaptors may be selected to fit them to any other X-Y plotter mechanism that is available, or which becomes available in the future.

Referring to FIGS. 1 through 6, and particularly to FIG. 1, the adaptor there shown is designated generally by the numeral 2 and is particularly configured on its outer periphery to fit the California Computer Products, Inc. X-Y plotter mechanism. As illustrated, the adaptor of FIG. 1 includes an intermediate portion 3 that may be categorized as a pen identification section, and a mounting section 4 the exterior configuration of which includes a first radially outwardly extending circumferential flange 6 surrounding the generally tubular body 7 of the adaptor, a second radially outwardly extending and circumferential flange 8 also surrounding the tubular body portion 7, and spaced intermediate the radially extending flange 6 and the open end 9 of the tubular adaptor. At its opposite end, the adaptor illustrated in FIG. 1 extends in an inspection and ejection end portion designated generally by the numeral 12, and comprising diametrically opposed wall sections 13, each of which extends circumferentially about the central axis of the adaptor for approximately 120°.

As illustrated in FIGS. 1 and 4, the end portion 12 of the adaptor opposite the open end 9, is provided with an integral end plate 14 that is provided with diametrically positioned and radially extending recesses 16 occupying the intervals between the semi-cylindrical and diametrically opposed wall portions 13. The recesses 16 also coincide with the location of elongated slots 17 formed in the end portion 12 as shown, which extend axially of the tubular body of the adaptor and define the lateral limits of the arcuate wall portions 13. As a consequence, as shown in FIG. 4, the closed end 18 of the tubular plotter pen 19 is accessible through the recesses 16 and through the slots so that an axially directed pen removal force may be imposed digitally or by an appropriate tool on the closed end 18 of the pen. It should be noted that my adaptors are not to be considered as limited to having a single open end, since adaptors open at both ends and frictionally press-fitted to the pen body by axial insertion forces are contemplated.

As indicated previously, it is important that the axial relationship between the elongated tubular adaptor 2 and the universal plotter pen 19 be carefully controlled. To achieve such control, there is provided on the adaptor, preferably on the end plate 14 of the adaptor, a button or boss 21, the height of which from the inner surface 22 of the plate may be closely controlled to provide an abutment surface 23 on the button 21 adapted to come into physical contact or abutment with the closed end 18 of the plotter pen. In instances where discrepancies creep into the manufacture of either the X-Y plotter mechanism, or the elongated tubular universal pens, the height of the end surface 23, constituting a dimensional control surface, may be easily changed to provide a button 21 of appropriate height, thus accommodating the combination of the universal pen and the adaptor for whatever idiosyncrasies and dimensional irregularities occur in the X-Y plotter mechanism or the universal pen. While the structure described above is preferred, an adaptor in which the end plate 14 is omitted (as in an adaptor open at both ends) may be provided with an appropriate abutment that controls the extent of insertion of the plotter pen.

It is important in the use of the adaptor forming the subject matter of this invention, that the universal pen structure 19, which comprises an elongated tubular body 24 of synthetic resinous material which is slightly compressible and laterally deformable, as by the imposition of a lateral force, and within which is contained the marking fluid to be delivered through the delivery portion 26 of the pen, be capable of insertion into the tubular adaptor 2 merely through the application of axial forces in opposite directions on the adaptor and the plotter pen. Thus, it is not desirable, nor is it necessary that there occur any twisting action or relative rotation between the plotter pen and the adaptor body. In fact, by the construction presented herein, such relative rotation is inhibited. To snugly accommodate the plotter pen within the adaptor body, and to frictionally yet removably retain the plotter pen therewithin, while preventing relative rotation of the pen and adaptor, the inner periphery 27 of the tubular adaptor body is tapered slightly and provided with a plurality of radially projecting circumferentially spaced and longitudinally extending ribs 28 that are circumferentially spaced apart 90°. As illustrated in FIG. 4, the recesses 16 formed in the end plate 14 encompass an arcuate length of only 60°, and one each of the recesses 16 is positioned between and adjacent the ends of two of the elongated ribs 28, the latter being parallel to the slots 17 and the associated lateral edges of the wall portions.

It will thus be seen that except for the four elongated ribs 28 projecting radially inwardly from the inner periphery 27 of the tubular body of the adaptor, the inner periphery 27 of the adaptor is smooth, and the tubular adaptor snugly accommodates axial insertion of the plotter pen without obstruction such as from threads.

The ribs press radially inwardly on the exterior surface of the resiliently deformable pen body and form a slight elongated depression in the pen body to accommodate the ribs and the interrelationship of the ribs and the coincident elongated depressions preclude relative rotation between the pen and adaptor. When the plotter pen is appropriately seated in the adaptor, the closed end 18 of the pen comes into engagement with the control surface 23 of button 21, and this fact is visually apparent through the slots 17 formed in the end portion 12 of the adaptor. Having visually determined that the plotter pen is appropriately seated in the adaptor, the adaptor may now be inserted into the X-Y plotter mechanism to which it pertains, and the plotter pen with its marking nib will be automatically placed in position for proper use.

Referring to FIG. 1, it will be noted that the identification section 3 constitutes a generally cylindrical shell 29 concentrically surrounding the tubular body 7 of the adaptor, the inner periphery of the tubular shell 29 being permanently attached to the outer periphery of the tubular body 7 by an appropriate adhesive. The exterior surface of the cylindrical identification shell is chrome plated and is provided with one or more identification bands 31 adapted for optical scanning to indicate the type of plotter pen with which the identification band is associated. A more detailed description of this method of identifying plotter pens is contained in U.S. Pat. No. 4,540,993, the contents of which are included herein by reference. It should be noted however that in the referenced U.S. Pat. No. 4,540,993, the identification sleeve 28 is removable and exchangeable from one pen to another while in the instant structure the identification member 29 is permanently attached to the tubular adaptor body 7.

Referring to FIG. 3, it will there be seen that the plotter pen 19 has been fully and appropriately seated in the adaptor body and that only the operative portion constituting the marking fluid delivery section 30 of the plotter pen projects from the open end 9 of the adaptor body.

Referring to the embodiment of the invention illustrated in FIGS. 7 through 12, this embodiment of the adaptor is specifically designed to mount a universal plotter pen in the type of X-Y plotter mechanism manufactured and sold by Houston Instrument, Inc. In this embodiment, the adaptor differs from the adaptor illustrated in the embodiment of FIG. 1 in those features that make this adaptor applicable to the Houston Instrument X-Y plotter, while all of the novel elements illustrated and described with respect to the embodiment illustrated in FIG. 1 are also incorporated in this adaptor and will be referred to by the same reference numbers to which a single prime has been applied. Referring to FIG. 7, as there shown, the adaptor is designated generally by the numeral 32 and includes an elongated tubular body 33 having an open end 34 and a mounting section designated generally by the numeral 36. The mounting section of this adaptor includes three radially outwardly extending flanges 37, 38 and 39, the flanges being an integral part of the tubular body 33 and projecting radially outwardly from the external periphery thereof. As illustrated in FIG. 7, the flanges 37–39 are grouped together and are coaxially related so that the flanges 37 and 39 are on opposite sides of the centrally disposed flange 38. Additionally, the flanges 37 and 39 have equal diameters, while the centrally disposed flange 38 has an increased diameter as shown. This cluster or grouping of flanges is dimensioned to fit the Houston Instrument Inc. X-Y plotter mechanism, and as shown is spaced a short distance from the open end 34 into which the tubular body of the universal pen 19 is adapted to be inserted without the need of a twisting action between the body of the plotter pen and the adaptor 32, or relative rotation therebetween as would be the case if screw threads were used as on conventional adaptors and plotter pens.

The end portion 12' of the tubular body 33 is provided with arcuate wall portions 12' diametrically opposed from one another and connected by an end plate 14' formed integrally with the wall portions 13', preferably through an injection molding process. The end plate 14' is provided with recesses 16' that are arcuate in configuration and extend circumferentially for 60° about the outer peripheral portion of the end plate 14'. As with the embodiment illustrated in FIG. 1, the recesses 16' are coincident with the ends of diametrically opposed and longitudinally extending slots 17' formed in the tubular body 33, the opposite edges of the slots 17' defining the opposite side edges of the arcuate wall portions 13'. Integrally formed with the end plate 14', and extending coaxially into the tubular body 33 is a circular button 21' that projects a finite distance from the inner surface 22' of the end plate 14', and which presents a control surface 23' against which the closed end 18 of the plotter pen abuts when a plotter pen is appropriately inserted into the adaptor through the open end 34.

As illustrated in FIG. 10, the arcuate wall portions 13' encompass a circumferential arc of 120° while the recesses 16' encompass circumferential arcs of 60° each. This arcuate arrangement of the wall portions 13' and the longitudinally extending slots 17' formed in the body of the tubular adaptor provides sufficient wall space on the tubular body to provide an inner peripheral wall surface 27' on each wall portion 13' on which inner peripheral surfaces 27' are integrally formed elongated longitudinally extending ribs 28' that extend from the closure plate 14' to an overlapping relationship with the radially outwardly extending flange 37. Thus, the ribs 28' extend over a major length of the inner peripheral surface of the tubular adaptor body 33 and are dimensioned so that the crowns of the ribs 28' impose sufficient frictional resistance against the outer periphery of the elongated tubular body of the pen 19, as previously discussed in connection with the embodiment illustrated in FIGS. 1 through 6, to prevent inadvertent axial displacement of the plotter pen in relation to the adaptor body. In this manner, the plotter pen 19 may be grasped by the nib-end portion between the thumb and index finger, and inserted into the open end 34 of the stationary adaptor body 33 merely by imposing an axial force on the plotter pen without any rotational force being applied thereto. It will be found that the tubular body will slip snugly between and frictionally engage the crowns of the elongated ribs 28' and securely retain the plotter pen appropriately positioned within the adaptor with the closed end 18 of the plotter pen snugly abutting the control surface 23' of the button 21'. As previously discussed, where idiosyncrasies exist in the X-Y plotter mechanism, or where dimensional irregularities occur in the plotter pen, the control surface 23' of the button 21' may be quickly and easily changed to insure that when the plotter pen is appropriately seated in the adaptor 32, the adaptor 32 will properly be received in the Houston Instrument Inc. X-Y plotter mechanism and the marking nib of the plotter pen will be properly positioned for plotting.

The third embodiment presented is illustrated in FIGS. 13 through 18, and includes an adaptor for a universal pen 19, the adaptor being suitable for mounting a universal pen 19 in an X-Y plotter mechanism manufactured and sold by Hewlett-Packard Inc. The novel elements illustrated and described with respect to the embodiment illustrated in FIG. 1 are also incorporated in this adaptor and will be referred to by the same reference number to which a double prime has been applied. The adaptor illustrated in FIG. 13 is designated generally by the numeral 41, and includes a tubular body 42, elongated and generally symmetrical about a longitudinal axis, and having an open end 43 into which the tubular body of the plotter pen 19 may be inserted. As with the other embodiments of the invention, the tubular body 42 is provided with a mounting section designated generally by the numeral 44 and including a radially outwardly extending circumferential flange 46 spaced from the open end 43 of the tubular body as shown.

At its end opposite the open end 43, the end portion 47 of the tubular adaptor body 42 is provided with a pair of diametrically opposed arcuate wall portions 13", the ends of the wall portions 13" remote from the open end 43 of the tubular body 42 being joined by an end plate 14" formed integrally with the ends of the wall portions 13", to lend rigidity to the structure. The end wall or end plate 14" is illustrated in plan in FIG. 16, and as there shown, the end plate is provided with diametrically opposed recesses 16", the recesses extending radially inwardly for a sufficient distance that the closed end 18 of the tubular body of the plotter pen 19 lies exposed in the recesses. The recesses 16" are coincident with longitudinally extending slots 17" that extend from the end plate 14" longitudinally along the tubular body 42 for approximately one-third the length of the adaptor body 42.

Formed integrally within the tubular body 42 on the inner surface of the end plate 14" is a button 21" that is formed integrally with the inner surface 22" of the end plate 14". The button 21" also includes an inner control surface 23" which functions to form an abutment for the closed end 18 of the plotter pen 19 when the plotter pen 19 is inserted into the open end 43 of the adaptor. When the closed end 18 of the plotter pen 19 abuts the control surface 23", it is visually apparent that the plotter pen has been inserted into the adaptor the appropriate amount and that its axial relationship with the adaptor body is proper for mounting the plotter pen in the Hewlett-Packard X-Y plotter mechanism.

To snugly receive and frictionally retain the tubular body of the plotter pen 19 within the adaptor 41, the inner peripheral surface 27" of the tubular body 42 is provided with a plurality of longitudinally extending and integrally formed ribs 28" that are circumferentially evenly spaced about the inner periphery 27" of the tubular body 42 and which extend in length for more than one-half the length of the adaptor body. As illustrated in the drawings, particularly FIGS. 16 and 17, the elongated ribs 28" are positioned at 90° intervals and are thus spaced adjacent the lateral edges of the slots 17"'. In this embodiment, the length of the ribs is approximately twice the length of the slots 17"', the bottom ends of which, as illustrated in the drawings, are rounded so that the lateral edges of each slot merge smoothly together as shown.

It will thus be seen that in each of the embodiments described above, the exterior configuration of the adaptor in its mounting portion follows the published dimensions of the X-Y plotter mechanisms manufactured by the three manufactures for whom adaptors have been illustrated. It will of course be obvious that similar adaptors but configured exteriorly to conform to the mounting dimensions for specific X-Y plotters may be produced without departing from the spirit and purpose of the invention. In each of the embodiments illustrated, exposure of the closed end 18 of the universal pen 19 through the recesses 16, 16' and 16", and the coincidence of the recesses with the underlying slots, enable the adaptor to be held in one hand and the plotter pen pushed in an ejection direction simply by imposing an axially directed force on the exposed portions of the closed end 18 of the plotter pen while it is removably held in the adaptor body. Such axially directed force need be no greater than is necessary to overcome the frictional resistance that exists between the crowns of the elongated ribs and the exterior periphery of the tubular body of the plotter pen 19. It should also be apparent from the description and illustrations above that when the plotter pen 19 is appropriately seated in the adaptor body, the closed end 18 of the plotter pen is held away from the inner surface 22 (22' and 22") of the end plate of the adaptor body, thus providing a narrow space above the closed end of the plotter pen through which an instrument may be inserted if it is desirable to utilize mechanical means for ejecting the plotter pen from the adaptor body. It is contemplated that initially, or until usage requires it, the plotter pens 19 may be ejected manually from the enclosing adaptor and a fresh plotter pen manually inserted to replace an expended one. However, it is realized that under appropriate circumstances, it may be worthwhile to design automatic equipment to perform this function. Exposing at least a portion of the closed end of the plotter pen body provides a surface against which automatic equipment may impinge to perform the ejection function.

Having thus described the invention, what is believed to be new and novel and sought to be protected by letters patent of the United States is as follows:

I claim:

1. An adaptor for receiving and operationally mounting in the plotter pen head assembly of an X-Y plotter a plotter pen having an elongated tubular body forming a reservoir for marking fluid and having a marking nib on one end thereof communicating with said marking fluid reservoir and a closed end opposite said marking nib, said adaptor comprising:
    (a) an elongated tubular sleeve closed at one end and open at the opposite end, and having an inner periphery devoid of threads and configured to snugly receive and frictionally removably retain a plotter pen when inserted within said sleeve; and
    (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use.

2. The combination according to claim 1, in which means are provided interiorly of said elongated tubular sleeve to frictionally engage a plotter pen when it is inserted into said elongated tubular sleeve whereby a plotter pen is normally retained in a stable axial relationship with said tubular sleeve yet may be removed from said elongated tubular sleeve by the imposition of opposed axially directed forces on the tubular sleeve and plotter pen.

3. The combination according to claim 2, in which said means interiorly of said elongated tubular sleeve adapted to frictionally engage a plotter pen comprises one or more projections extending radially into the sleeve.

4. The combination according to claim 3, in which a plurality of projections are provided projecting radially into said sleeve.

5. The combination according to claim 3, in which said one or more projections comprise an elongated rib or ribs extending parallel to the longitudinal axis of the sleeve.

6. The combination according to claim 3, in which a plurality of said projections are provided, and said projections comprise a plurality of circumferentially spaced elongated ribs extending parallel to the longitudinal axis of the sleeve.

7. The combination according to claim 3, in which said one or more projections extending radially into the sleeve are adapted to depress the tubular body of a plotter pen in an area coincident with the projection whereby relative rotation between a plotter pen and the adaptor is inhibited.

8. An adaptor for receiving and operationally mounting in the plotter pen head assembly of an X-Y plotter, a plotter pen having an elongated tubular body forming a reservoir for marking fluid and having a marking nib on one end thereof communicating with said marking fluid reservoir and a closed end opposite said marking nib, said adaptor comprising:
    (a) an elongated tubular sleeve having an inner periphery devoid of threads and configured to snugly receive and frictionally removably retain a plotter pen when inserted within said sleeve;
    (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use; and
    (c) means on said elongated tubular sleeve giving access to an end portion of a tubular plotter pen remote from the marking nib when said plotter pen is inserted within said elongated tubular sleeve whereby removal of a plotter pen from the interior of the elongated tubular sleeve is facilitated through the imposition of opposed axially directed forces on said sleeve and plotter pen.

9. The combination according to claim 8, in which said means on said elongated tubular sleeve giving access to an end portion of a tubular plotter pen to facilitate removal of a plotter pen from the interior thereof comprises at least one elongated slot formed in said elongated tubular sleeve.

10. The combination according to claim 9, in which a pair of elongated diametrically opposed slots are formed in said elongated tubular sleeve.

11. The combination according to claim 8, in which said elongated tubular sleeve is open at one end and closed at the opposite end, and at least one radially and circumferentially extending recess is formed in said closed end giving access to the closed end of a plotter pen when a plotter pen is appropriately seated in said elongated tubular sleeve.

12. An adaptor for receiving and operationally mounting in the plotter pen head assembly of an X-Y plotter, a plotter pen having an elongated tubular body forming a reservoir for marking fluid and having a marking nib on one end thereof communicating with said marking fluid reservoir and a closed end opposite said marking nib, said adaptor comprising:
   (a) an elongated tubular sleeve having an inner periphery devoid of threads and configured to snugly receive and frictionally removably retain a plotter pen when inserted within said sleeve; and
   (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use;
   (c) wherein the inner periphery of said elongated tubular sleeve is tapered from a predetermined diameter at said end associated with the marking nib of a plotter pen to a relatively smaller diameter at its opposite end associated with the closed end of a plotter pen inserted thereinto.

13. An adaptor for receiving and operationally mounting in the plotter pen head assembly of an X-Y plotter, a plotter pen having an elongated tubular body forming a reservoir for marking fluid and having a marking nib in one end thereof communicating with said marking fluid reservoir and a closed end opposite said marking nib, said adaptor comprising:
   (a) an elongated tubular sleeve having an inner periphery devoid of threads and configured to snugly receive and frictionally removably retain a plotter pen when inserted within said sleeve;
   (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use; and
   (c) means within said elongated tubular sleeve for limiting insertion of a plotter pen body into said elongated tubular sleeve to a predetermined axial relationship with said elongated tubular sleeve.

14. An adaptor for receiving and operationally mounting in the plotter pen head assembly of an X-Y plotter, a plotter pen having an elongated tubular body forming a reservoir for marking fluid and having a marking nib on one end thereof communicating with said marking fluid reservoir and a closed end opposite said marking nib, said adaptor comprising:
   (a) an elongated tubular sleeve having an inner periphery devoid of threads and configured to snugly receive and frictionally removably retain a plotter pen when inserted within said sleeve; and
   (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use;
   (c) said means on the exterior surface of the elongated tubular sleeve configured to operationally cooperate with a plotter pen head assembly when associated therewith comprising at least one radially outwardly extending circumferential flange.

15. An adaptor for receiving and operationally mounting in the plotter pen head assembly of an X-Y plotter, a plotter pen having an elongated tubular body forming a reservoir for marking fluid and having a marking nib on one end thereof communicating with said marking fluid reservoir and a closed end opposite said marking nib, said adaptor comprising:
   (a) an elongated tubular sleeve having an inner periphery devoid of threads and configured to snugly receive and frictionally removably retain a plotter pen when inserted within said sleeve;
   (b) means on the exterior surface of said elongated tubular sleeve configured to operationally cooperate with a plotter pen head assembly when said adaptor is mounted thereon whereby said adaptor with a plotter pen inserted therein may be selectively and detachably mounted on said plotter pen head assembly for placement of the marking nib of the plotter pen in a position of use; and
   (c) wherein said elongated tubular sleeve is open at one end and closed at the opposite end, and at least one radially and circumferentially extending recess is formed in said closed end giving access to the closed end of a plotter pen when a plotter pen is appropriately seated in said elongated tubular sleeve.

16. The combination according to claim 15, in which a boss extends into said sleeve, whereby when a plotter pen is appropriately inserted in said tubular sleeve the closed end of the plotter pen body abuts the boss to properly position the plotter pen axially in relation to the sleeve.

17. The combination according to claim 16, in which said sleeve is provided with a closed end, said boss is formed integrally with said closed end and extends axially a predetermined distance into said sleeve toward the open end thereof, whereby when a plotter pen is appropriately inserted and positioned in said tubular sleeve the closed end of the plotter pen body abuts the inner end of the boss.

* * * * *